United States Patent [19]

Purvey

[11] Patent Number: 4,871,458

[45] Date of Patent: Oct. 3, 1989

[54] CENTRIFUGAL FILTERS

[75] Inventor: Ronald J. Purvey, Axminster, England

[73] Assignee: AE PLC, Rugby, England

[21] Appl. No.: 188,472

[22] Filed: Apr. 29, 1988

[30] Foreign Application Priority Data

May 9, 1987 [GB] United Kingdom ................. 8711007

[51] Int. Cl.$^{4}$ ................................................ B01D 21/26

[52] U.S. Cl. ................................... 210/360.1; 210/377

[58] Field of Search ...................... 210/232, 238, 360.1, 210/377

[56] References Cited

U.S. PATENT DOCUMENTS 2,865,562 12/1958 Burke .................................... 233/24
4,400,167 8/1983 Beazley et al. .............. 210/360.1 X
4,431,540 2/1984 Budzich ........................... 210/360.1

FOREIGN PATENT DOCUMENTS 0193000 9/1986 European Pat. Off. .
0731312 6/1955 United Kingdom .

*Primary Examiner*—Charles Hart
*Attorney, Agent, or Firm*—William R. Hinds

[57] ABSTRACT

A centrifugal filter is described with a disassemblable cleaning rotor having a fluid flow directing member comprising an annular member which is removably located by its outer periphery by a sealing member and a base member.

4 Claims, 1 Drawing Sheet

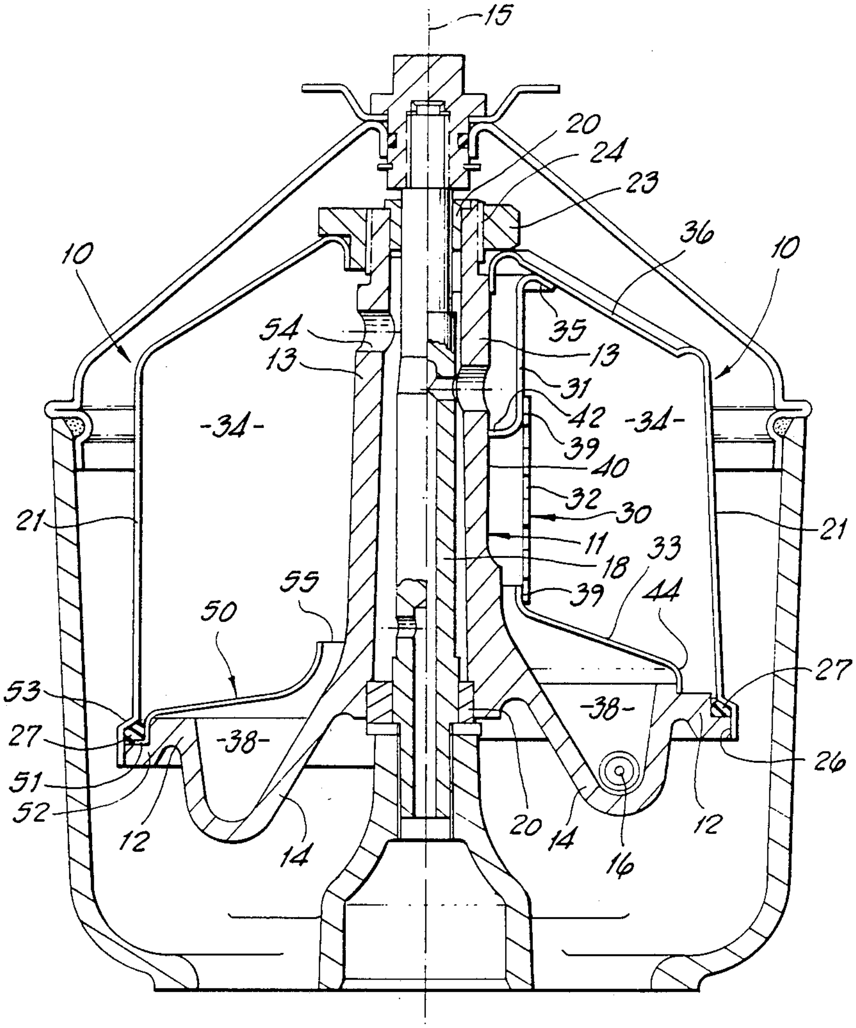
15
20
24
23
36
10
10
54
35
13
13
31
42
-34-
-34-
39
40
32
30
21
21
11
18
33
55
39
44
50
27
53
-38-
-38-
27
26
51
52
12
14
20
14
16
12

CENTRIFUGAL FILTERS

The present invention relates to centrifugal filters and particularly, though not exclusively, to oil filters for engines and transmissions.

Centrifugal filters for removing impurities and contaminants from oil are well known. Those operating on the oil pressure of an engine to drive the cleaning rotor by reaction from issuing oil jets are also well known.

It is necessary to direct the oil flow within the rotor in order to achieve separation of the contaminants. Usually the oil flow is outwardly to the outer wall of the rotor and is then forced inwardly by the oil pressure towards the axis of the rotor before entering a chamber in which the driving nozzles are located. The rotor is thus permanently full of oil and maintained so by the oil pressure when the engine, for example, is running.

In rotors which are disassemblable for cleaning the oil flow directing member is generally a relatively expensive fabricated construction.

It has now been found that oil flow may be directed within the rotor in a much simpler and less expensive manner and also afford greater contaminant capacity.

In accordance with the present invention, there is provided a cleaning rotor for a centrifugal oil filter, the rotor comprising a central support of generally tubular form and which support is adapted to receive bearings for rotation about a shaft in a centrifugal oil filter, a base plate which is formed integrally with said central support and which base plate includes reaction drive nozzles, a cover member of generally domed shape and which extends between the upper end of said support and the outer periphery of said base plate to define a rotor chamber, an internal oil-flow directing member of generally annular form having a central aperture which extends around said central support to form an open annulus therebetween for the passage of oil from the rotor chamber into a nozzle chamber formed between said flow directing member and said base plate, the outer periphery of said flow directing member having a radially outwardly directed flange supported by said base plate, and there being a sealing member held in compression between the top surface of said outwardly directed flange and the inner, lower periphery of said cover member to prevent a flow of oil between the outer periphery of said flow directing member and said base plate.

It has been found in one embodiment of the present invention that the fluid flow directing member is particularly effective in rotors having driving nozzles located in relatively high volume, low turbulence troughs which lie below the flow directing member.

A very significant advantage conferred by the construction of a filter according to the present invention is the fact that the outer periphery of the flow directing member is sealed against oil flow in the wrong direction. It has been found on some prior art filters that the fabricated construction, if not completely accurate in assembly, sometimes allows oil, for example, to escape between the flow directing member and the base member directly into the nozzle chamber. The effect of this is that uneven dirt build-up in the rotor is promoted thus causing the rotor to become unbalanced which results in vibration which slows the rotor. Such slowing of the rotor reduces the cleaning efficiency which is dependant on rotational velocity.

In order that the present invention may be more fully understood an example will now be described with reference to the accompanying drawing which shows a section in elevation split about the axis and showing a centrifugal filter according to the present invention on the left-hand side and a prior art filter on the right-hand side of the axis.

Referring now to the prior art filter on the right-hand side of the drawing and where the rotor is shown generally at 10. The rotor includes a casting 11 having an integrally formed base plate 12 and standpipe 13. The base plate includes two troughs 14, each symmetrically disposed about an axis 15. The troughs 14 extend through about 180° each and gradually deepen from 0° to their maximum depth at about 180° in a smooth contour. Each trough has a nozzle 16 lying in an end wall where the troughs end at their maximum depth. The rotor casting 11 is supported on a spindle 18 by two bearings 20. The rotor 10 is closed by a domed top cover 21 which is secured by a nut 23 on a threaded portion 24 of the standpipe 13. The joint 26 at the lower extremity of the cover 21 is sealed by a 'O" ring 27. The oil flow directing member 30 is a fabrication comprising three individual pieces; an upper cup-like member 31, a perforated screen 32 and a lower annular member 33. The member 31 serves to direct oil in an upwardly direction and into the rotor chamber 34 via grooves formed between a lip 35 of the cup member and stiffening depressions 36 in the domed cover member 21. The chamber 34 is filled with oil and which is forced through the screen 32 into the chamber 38 formed between the troughs 14 and the lower annular member 33. Oil is expelled from the nozzles 16 in a jet to drive the rotor by reaction. The member 30 is formed as a unit by spot welds 39 securing together the members 31,32 and 33. The casting 11 requires machining on the outer surface 40 of the pipe 13 to form a close fit with lower inturned portion 42 of the member 31 and also on a flange 44 which co-operates with the outer periphery of the annular member 33.

Referring now to the left-hand side of the drawing and where similar features are denoted by common reference numerals. The oil flow directing member comprises only a single sheet metal annular pressing 50 having a flanged portion 51 at its outer periphery. The member 50 is held in position by means of the "O" ring seal 27 which both holds the member 50 down by the flange 51 so that it is accurately located over the flange 52 of the base plate 12 and also forms an oil seal preventing a flow of oil between the flanges 51 and 52 into the chamber 38. The oil seal 27 is compressed by the lower extremity 53 of the cover member 21. Oil issues directly into the chamber 34 from the port 54 in the standpipe 13. The chamber 34 is filled with oil, and the oil is directed into the chamber 38 formed between the member 50 and the trough 14 via the annulus 55 formed between the inner periphery of the member 50 and the standpipe 13. No additional machining of the casting 11 is necessitated by the flow directing member of the present invention and thus manufacturing costs are further reduced.

An additional advantage of the invention is that less volume within the rotor is taken up by the oil flow directing member according to the invention, thus greater contaminant capacity and, therefore, longer life is provided.

The invention has been described with regard to a rotor having nozzles located in smoothly contoured troughs and which type of construction affords an improved performance in terms of increased rotational velocity for any given oil pressure by virtue of the reduced oil turbulence in the region of the nozzle. Such a construction is fully described with reference to disposable rotors in published European patent application No. 0193000 of common ownership herewith. Known nozzles of the type which are in the form of pips or other protuberances which extend from the rotor base may alternatively be used.

I claim:

1. A cleaning rotor for a centrifugal oil filter, the rotor comprising a central support of generally tubular form and which support is adapted to receive bearings for rotation about a shaft in a centrifugal oil filter, a base plate which is formed integrally with said central support and which base plate includes reaction drive nozzles, a cover member of generally domed shape and which extends between the upper end of said support and the outer periphery of said base plate to define a rotor chamber, an internal oil-flow directing member of generally annular form having a central aperture which extends around said central support to form an open annulus therebetween for the passage of oil from the rotor chamber into a nozzle chamber formed between said flow directing member and said base plate, the outer periphery of said flow directing member having a radially outwardly directed flange supported by said base plate, and there being a sealing member held in compression between the top surface of said outwardly directed flange and the inner, lower periphery of said cover member to prevent a flow of oil between the outer periphery of said flow directing member and said base plate.

2. A cleaning rotor as claimed in claim 1 wherein said flow directing member is a sheet steel pressing.

3. A cleaning rotor as claimed in claim 1 wherein the outer periphery of said flow directing member is of generally L-shaped configuration in which said radially outwardly directed flange forms the base of the L and an inwardly adjacent generally axially extending portion forms the leg of the L, the lower periphery of said cover member having a generally outwardly extending inner surface portion generally overlying said flange of said flow directing member and terminating in a generally axially extending inner surface portion lying generally radially outwardly of the leg of said L-shaped configuration, said sealing member being held in compression in the space defined by said L-shaped configuration and the opposite inner surface portions of the lower periphery of said cover member, the lower surface of said outwardly directed flange bearing against the upper surface of said base plate.

4. A cleaning rotor as claimed in claim 3 wherein part of the outer periphery of said base plate is formed so as to generally correspond to the generally L-shaped configuration of the outer periphery of said flow directing member such that the L-shaped configuration of the flow directing member is nested in a generally correspondingly configured portion of said base plate.

* * * * *